(12) United States Patent
Hoban et al.

(10) Patent No.: US 8,826,306 B2
(45) Date of Patent: Sep. 2, 2014

(54) HIDDEN REPRESENTATIONS FOR MARSHALING THROUGH HOSTED SCRIPTING ENVIRONMENTS

(75) Inventors: Lucas J. Hoban, Seattle, WA (US); Caroline G. Murdoch, Seattle, WA (US); Gaurav Seth, Redmond, WA (US); Hitesh Kanwathirtha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 13/227,666

(22) Filed: Sep. 8, 2011

(65) Prior Publication Data

US 2013/0067433 A1    Mar. 14, 2013

(51) Int. Cl.
*G06F 3/00*   (2006.01)
*G06F 17/00*  (2006.01)
*G06F 9/44*   (2006.01)
*G06F 9/45*   (2006.01)

(52) U.S. Cl.
CPC ........................................ *G06F 8/51* (2013.01)
USPC .......................... 719/320; 715/204; 717/115

(58) Field of Classification Search
None
See application file for complete search history.

(56) References Cited

U.S. PATENT DOCUMENTS

| | | | |
|---|---|---|---|
| 6,311,320 B1 * | 10/2001 | Jibbe | ............................. 717/111 |
| 7,424,722 B2 | 9/2008 | Joseph | |
| 7,793,255 B1 | 9/2010 | Kawaguchi et al. | |
| 2005/0091420 A1 * | 4/2005 | Snover et al. | ...................... 710/1 |
| 2005/0246677 A1 | 11/2005 | Mountain et al. | |
| 2006/0080646 A1 * | 4/2006 | Aman | ........................... 717/143 |
| 2006/0085742 A1 * | 4/2006 | Harold et al. | ................. 715/517 |
| 2009/0234891 A1 | 9/2009 | Nelson et al. | |

OTHER PUBLICATIONS

"A REST Protocol and Composite Format for Interactive Web Documents", Boyer, IBM, 2009, pp. 1-10.*
"Examination System Based on Script Engine Technology", Zhao, 2009, pp. 1-3.*
Tu, et al., "EcoCast: Interactive, Object-Oriented Macroprogramming for Networks of Ultra-Compact Wireless Sensor Nodes", Retrieved at <<http://ieeexplore.ieee.org/stamp/stamp.jsp?arnumber=05779071>>, 10th International Conference on Information Processing in Sensor Networks, Apr. 12-14, 2011, pp. 113-114.

(Continued)

*Primary Examiner* — Tuan Dao
(74) *Attorney, Agent, or Firm* — Kevin Sullivan; Brian Haslam; Micky Minhas

(57) ABSTRACT

Systems and methods are described for passing a data item to and obtaining the data item from a scripting environment hosted by a host environment, wherein each environment uses a different representation of the data item. The host environment passes the data item to the scripting environment by passing a host environment representation of the data item that is hidden from developers of scripts to be executed by the scripting environment. This enables the original host environment representation of the data item to be preserved even after the data item has been passed to and from the scripting environment in the case where the scripting environment does not modify the data item, and also facilitates lazy conversion of the data item or avoidance of conversion entirely in the case where the scripting environment does not modify the data item.

17 Claims, 4 Drawing Sheets

(56) References Cited

OTHER PUBLICATIONS

Fox, et al., "Adapting to Network and Client Variability via On-Demand Dynamic Distillation", Retrieved at <<http://www-2.cs.cmu.edu/~srini/15-744/readings/FGBA96.pdf>>, Proceedings of the seventh international conference on Architectural support for programming languages and operating systems, Oct. 1-4, 1996, pp. 1-11.

"Data Representation", Retrieved at <<http://effbot.org/media/downloads/librarybook-data-representation.pdf>>, Retrieved Date: Aug. 23, 2011, pp. 26.

* cited by examiner

HIDDEN REPRESENTATIONS FOR MARSHALING THROUGH HOSTED SCRIPTING ENVIRONMENTS

BACKGROUND

Simple data items like dates, numbers and strings may have different representations that are used in different programming environments. Such representations may define various characteristics that relate to the way the data item is used in a particular programming environment. For example, such representations may define semantically meaningful characteristics, such as precision, as well as semantically invisible characteristics, such as performance.

As is known in the art, a scripting environment may be hosted within another programming environment, which may be referred to as the host environment. The host environment may comprise, for example and without limitation, a programming environment associated with a Web browser, operating system, game application, or enterprise application. A script that is written for execution by the hosted scripting environment may refer to a data item that is to be obtained from and/or returned to the host environment and that has a well-defined representation that is semantically meaningful within the context of the scripting environment. However, the representation of the data item used by the host environment may be different than that used by the scripting environment.

Traditionally, two solutions have been used to address the issue of differing host environment and scripting environment representations. In accordance with the first solution, when interface logic of the host is marshaling the data item to and from the scripting environment, the interface logic converts between the two different representations. However, such conversion can result in the loss of semantically meaningful information and can also adversely impact the performance of the computing platform upon which the different environments are executing. In accordance with the second solution, additional distinct data types are created for each of the different representations and exposed to the developer, along with user-available bridges for facilitating manual conversions. However, this approach requires the developer to learn and manage new data types that are not normally associated with the scripting environment. Furthermore, scripts that are written to reference the new data types will not be executable by scripting environments that haven't been modified to recognize them, thereby limiting the reusability/portability of such scripts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Systems and methods are described herein for passing a data item from a host environment to a scripting environment hosted by the host environment and for returning the data item from the scripting environment to the host environment, wherein the host environment and the scripting environment each utilize different representations of the data item. In accordance with an embodiment, passing the data item from the host environment to the scripting environment involves passing a host environment representation of the data item from the host environment to the scripting environment by interface logic that comprises part of the host environment, part of the scripting environment, or that is outside both the host environment and scripting environment. The host environment representation that is passed to the scripting environment is "hidden" in the sense that it is not exposed to the developer of scripts to be executed by the scripting environment and is not referenced by such scripts. In further accordance with such an embodiment, returning the data item to the host environment from the scripting environment involves passing a data structure that includes the host environment representation of the data item back to the interface logic.

In still further accordance with such an embodiment, the scripting environment includes in the data structure an indicator that indicates whether or not the scripting environment has modified the data item. If the scripting environment does not modify the data item, if and when the data structure is passed to the interface logic from the scripting environment, the state of the indicator may be examined to determine that the scripting environment has not modified the data item. Based on that determination, the interface logic can obtain the host environment representation of the data item from the data structure and pass it to the host environment for use in one or more processing steps subsequently performed by the host processor. Thus, even though the data item was passed to and from the scripting environment, the representation of the data item that is semantically meaningful to the host environment has been preserved.

However, if the scripting environment does modify the data item, then it adds a scripting environment representation of the modified data item to the data structure and sets the indicator accordingly. In this case, if and when the data structure is passed to the interface logic from the scripting environment, the state of the indicator may be examined to determine that the scripting environment has modified the data item. Based on that determination, the interface logic can obtain a host environment representation of the modified data item by converting the scripting environment representation of the modified data item included in the data structure. The interface logic can then pass the host environment representation of the modified data item to the host environment for use in the processing step(s).

In further accordance with the foregoing embodiment, a translation from the host environment representation of the data item to the scripting environment representation of the data item need not occur when the data item is passed from the host environment to the scripting environment. Rather, such translation can be delayed until such time as the scripting environment is actually required to modify or observe the data item (which may be referred to herein as "lazily converting" the data item) or avoided entirely in the case where the scripting environment does not modify or observe the data item.

The foregoing approach to passing a data item from the host environment to the scripting environment and back again is advantageous in at least that: (1) it does not result in the loss of semantically meaningful information in cases where the scripting environment is not required to modify the data item; (2) it does not require a developer to learn and manage new data types that are not normally associated with the scripting environment; and (3) it can improve system performance by enabling lazy conversion of data items or by avoiding conversion entirely.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
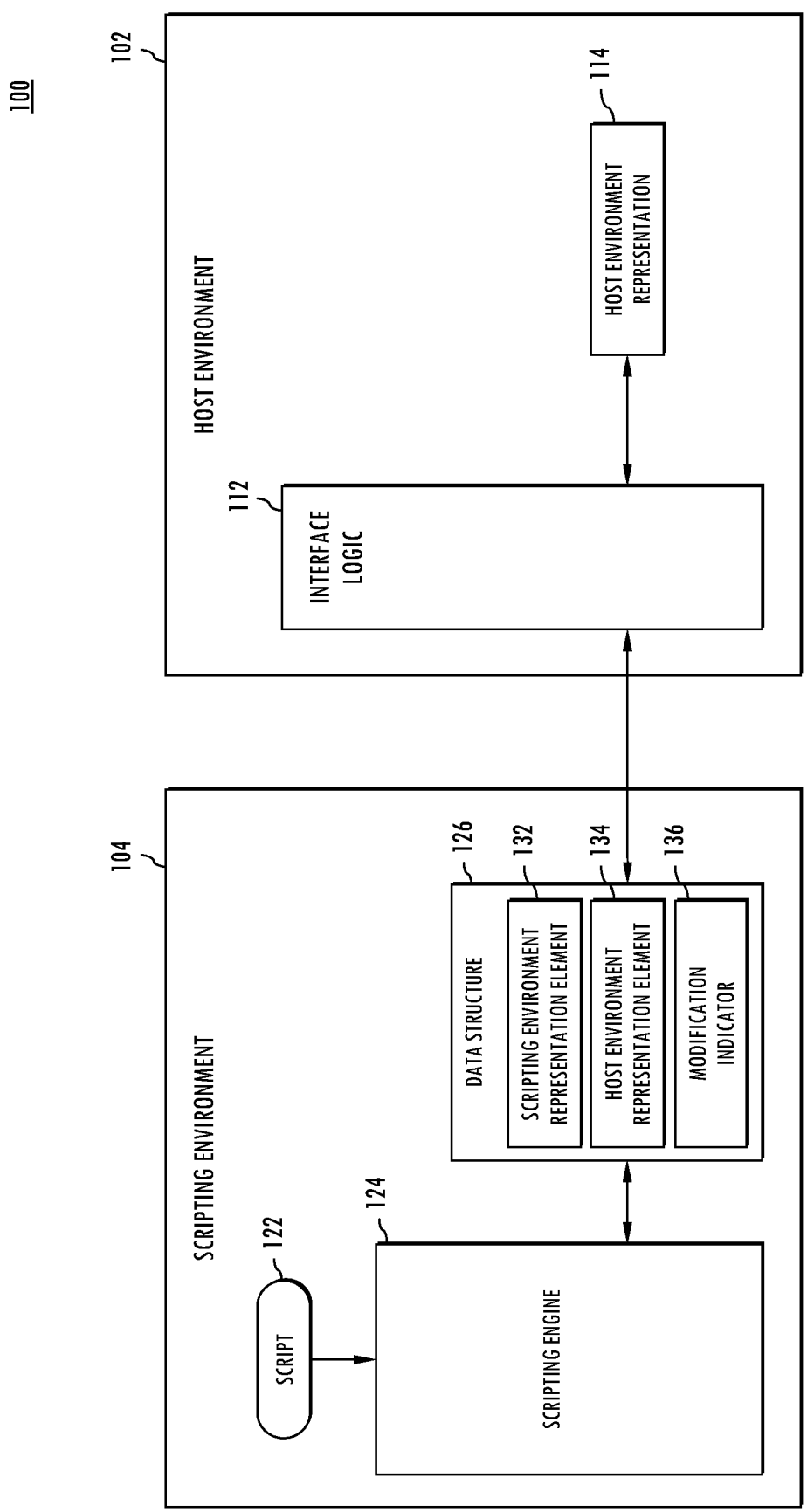
FIG. 1 is a block diagram of an example system that implements a method for passing data items between a hosting environment and a scripting environment in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example System for Passing Data Items Between a Host Environment and a Scripting Environment FIG. 1 is a block diagram of an example system 100 that implements a method for passing data items between a host environment 102 and a scripting environment 104 in accordance with an embodiment. System 100 is described herein by way of example only. Based on the teachings provided herein, persons skilled in the relevant art(s) will appreciate that the methods described below may be implemented by systems other than that shown in FIG. 1.

Host environment 102 is intended to represent software (e.g., one or more computer programs) being executed by a computer or other processor-based system or device, and data associated therewith. One example of a computer system that can execute software is described below in reference to FIG. 4. The software associated with host environment 102 may comprise, for example and without limitation, a Web browser, a game application, an enterprise application, or an operating system. However, these examples are not intended to be limiting.

Scripting environment 104 is also intended to represent software being executed by a computer or other processor-based system or device, and data associated therewith. As shown in FIG. 1, scripting environment 104 includes a scripting engine 124. Scripting engine 124 is configured to interpret and execute scripts developed in accordance with a scripting language. For example, scripting engine 124 may be configured to interpret and execute scripts developed in accordance with any of a variety of well-known scripting languages, including but not limited to JavaScript, JScript, JScript.NET, Perl, PerlScript, VBScript, PHP, ASP and ASP.NET.

In system 100 of FIG. 1, host environment 102 hosts scripting environment 104. Accordingly, host environment 102 is programmed to invoke or instantiate scripting environment 104 to facilitate the execution of one or more scripts, such as script 122.

As shown in FIG. 1, host environment 102 also includes interface logic 112. Interface logic 112 is configured to pass information between host environment 102 and scripting environment 104 after scripting environment 104 has been instantiated by host environment 102. Such passing of information between host environment 102 and scripting environment 104 may comprise, for example and without limitation, transferring a copy of information stored in a memory space used by or accessible only to host environment 102 to a memory space used by or accessible only to scripting environment 104 or vice versa. Such passing of information may also comprise sending a pointer to information stored in a memory space accessible to both host environment 102 and scripting environment 104. Still other methods may be used by interface logic 112 to transfer information between host environment 102 and scripting environment 104.

In particular, interface logic 112 is configured to enable data items to be passed from host environment 102 to scripting environment 104 for use during execution of a script by scripting environment 104. Such data items may be referenced by scripts that will be interpreted and executed by scripting environment, such as script 122. The data items may include any data or object type that is natively supported by one or both of host environment 102 and scripting environment 104. Examples of such data items include, but are not limited to, simple data items such as dates, numbers and strings. Interface logic 112 is also configured to enable such data items to be returned from scripting environment 104 to host environment 102 in a modified or unmodified state for use in one or more subsequent processing steps by host environment 102.

In one embodiment, interface logic 112 comprises a set of application programming interfaces (APIs) that can be called to perform the above-described functions. Furthermore, although interface logic 112 is shown as being a component of host environment 102, in alternate embodiments, interface logic 112 may be a component of scripting environment 104. In still further embodiments, interface logic 112 may be a component that is logically distinct from host environment 102 and scripting environment 104 but that nonetheless can be invoked by one or both of those environments to perform functions such as transferring data items to and from host environment 102 or scripting environment 104.

Since host environment 102 and scripting environment 104 represent different programming environments, data items that are passed between the two environments may have different representations that are used in each environment. Such representations may define various characteristics that relate to the way the data item is used in each environment. For example, such representations may define semantically meaningful characteristics, such as precision, as well as semantically invisible characteristics, such as performance.

By way of example, host environment 102 may comprise an operating system runtime that utilizes a C-style structure to define a date/time data item, referred to below as "DateTime." The DateTime structure may be defined in accordance with the following declaration:

```
namespace Windows
{
    namespace Foundation
    {
        typedef struct DateTime
            __int64         UniversalTime;
        } DateTime;
    }
}
```

Here, DateTime is represented by a 64-bit signed integer and is expressed in accordance with the Coordinated Universal Time (UTC) standard. Where DateTime has a positive value, it will represent a number of 100-nanosecond intervals that have elapsed since 12:00:00 midnight on Jan. 1, 1601 A.D. Where DateTime has a negative value, it will represent a number of 100-nanosecond intervals that have elapsed between the start of an event and 12:00:00 midnight on Jan. 1, 1601 A.D. The range of DateTime will be 25,000 years forward or backward from 12:00:00 midnight on Jan. 1, 1601 A.D.

In contrast to this, scripting environment 104 may use a different representation for the same date/time data item. For example, scripting environment 104 may comprise a JavaScript scripting environment that represents the date/time data item as a double precision floating point value having 1 millisecond granularity.

If a conversion-based approach such as that described in the Background Section above were to be used to pass data items between host environment 102 and scripting environment 104, then, in accordance with the foregoing example, any attempt to convert between the date/time data item representation of host environment 102, which has a 100-nanosecond granularity, to the date/time data item representation of scripting environment 104, which has a 1 millisecond granularity, will result in an undesirable loss of precision. This loss of precision will occur when the data item is first passed from host environment 102 to scripting environment 104. Furthermore, if scripting environment 104 passes the data item back to host environment 102 for use in one or more subsequent processing steps, then the loss of precision will be propagated back to host environment 102.

To help address this issue, system 100 utilizes a method for passing a data item between host environment 102 and scripting environment 104 that can avoid performing any conversion of the data item in instances where scripting environment 104 does not modify the data item. Even when scripting environment 104 does modify the data item and a conversion must be performed, the method can advantageously be used to defer the performance of the conversion until such time as scripting environment 104 is required to modify or observe the data item, as opposed to performing the conversion when host environment 102 first passes the data item to scripting environment 104. Such deferred conversion may be referred to as "lazily converting" the data item. The method will be described in detail in the following Section.

The software associated with host environment 102 and scripting environment 104 shown in FIG. 1 may each execute on the same processor-based system or device. Alternatively, the software associated with each of host environment 102 and scripting environment 104 may execute on different processor-based systems or devices and communication between the two environments may be carried out via one or more wired and/or wireless links between the two systems or devices using suitable communication protocols.

The software instructions and data associated with host environment 102 and scripting environment 104 may be stored on any known computer-readable storage medium. Such storage media may include one or more of volatile and nonvolatile, removable and non-removable media implemented in any method or technology for storage of information such as computer-readable instructions, data structures, software modules or other data. The storage media may include, but is not limited to, one or more of RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store desired information and which can accessed by a computer or other processor-based system or device.

Figure 2:
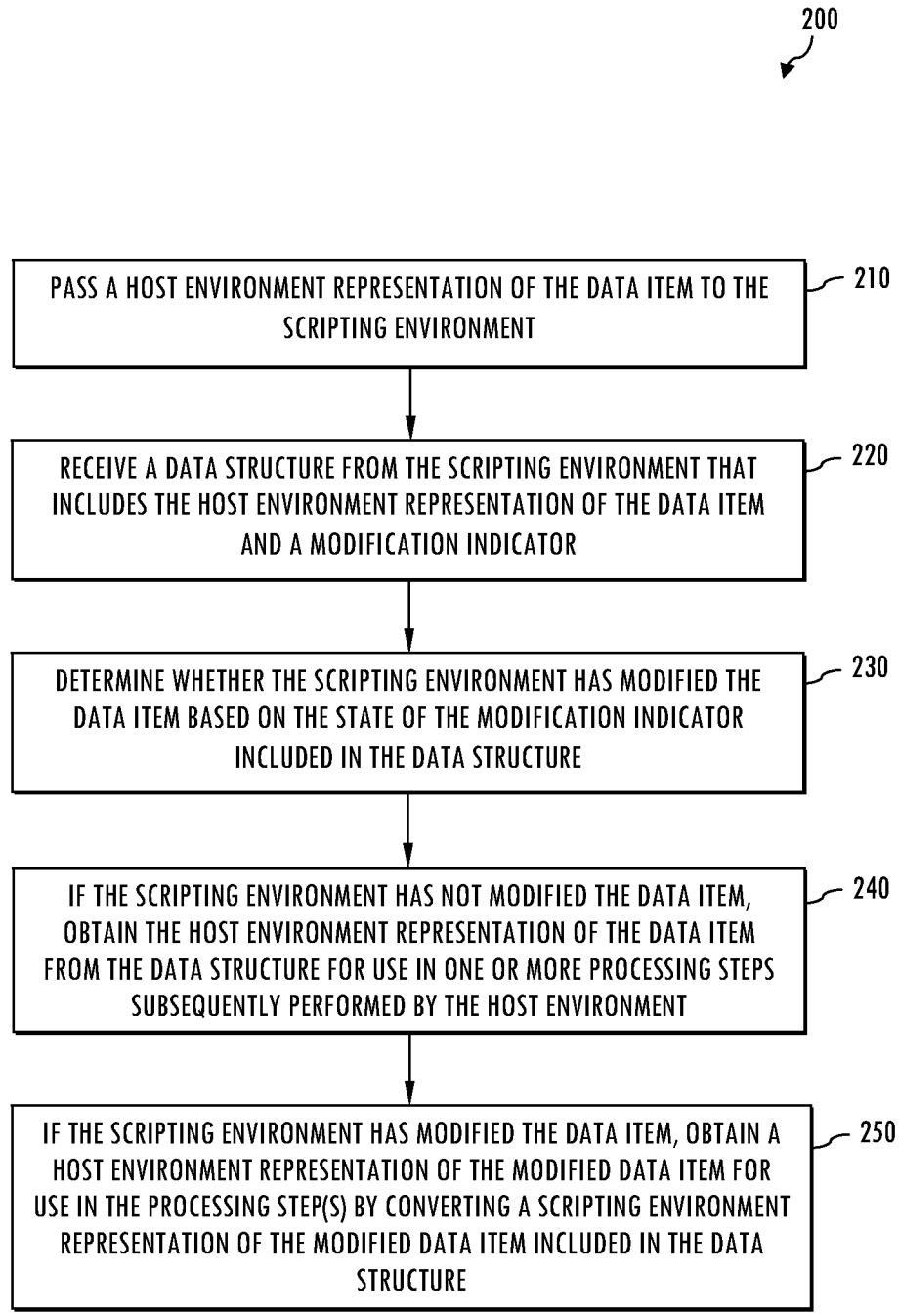
FIG. 2 depicts a method for passing a data item to and obtaining the data item from a scripting environment that is hosted by a host environment in accordance with an embodiment.

III. Example Methods for Passing Data Items Between a Host Environment and a Scripting Environment FIG. 2 depicts a flowchart 200 of a method for passing a data item from host environment 102 to scripting environment 104 and for returning the data item from scripting environment 104 to host environment 102 in accordance with one embodiment. The method of flowchart 200 will now be described with continued reference to various elements of system 100 of FIG. 1. However, the method of flowchart 200 is not limited to that implementation and may be carried out using other elements or systems entirely.

The method of flowchart 200 is performed after host environment 102 has created an instance of scripting environment 104. The data item referred to in flowchart 200 is a data item that is maintained by host environment 102 and that is also referenced by a script 122 being executed by scripting environment 104. Depending upon the implementation, script 122 may be provided to scripting environment 104 by host environment 102 or via some other mechanism.

As shown in FIG. 2, the method of flowchart 200 begins at step 210 in which interface logic 112 of host environment 102 passes a host environment representation 114 of the data item to scripting environment 104. For example, host environment representation 114 may comprise a 64-bit signed integer representation of a date/time data item that is maintained by host environment 102. Scripting environment 104 stores host environment representation 114 in a host environment representation element 134 of a data structure 126 that is created by scripting engine 124 and stored in scripting environment 104. Host environment representation element 134 included in data structure 126 is "hidden" in the sense that it is not exposed to the developer of scripts to be executed by scripting environment 104 and is not referenced by such scripts. For example, host environment representation element 132 may not be referenced by any developer-facing APIs associated with scripting environment 104.

After scripting environment 104 has stored host environment representation 114 in data structure 126, it may further modify data structure 126. Whether scripting environment 104 further modifies data structure 126 and the manner in which it further modifies data structure 126 depends at least in part on whether execution of script 122 by scripting environment 104 requires the data item to be modified.

If scripting environment 104 is required to modify the data item, then it first obtains a scripting environment representation of the data item. In one embodiment, scripting environment 104 generates the scripting environment representation of the data item by obtaining host environment representation 114 that has been stored as element 134 and converting it. For example, scripting environment 104 may generate the scripting environment representation of the data item by converting a 64-bit signed integer representation of a date/time data item that is used by host environment 102 into a 64-bit double precision floating point representation of the date/time data item that is used by scripting environment 104. In accordance with this embodiment, such conversion may be performed by scripting environment 104 at any time up to or immediately before the data item is first modified or observed by scripting environment 104. Thus, scripting environment 104 may "lazily convert" the data item. In accordance with such an embodiment, interface logic 112 of host environment 102 need not convert the data item prior to providing it to scripting environment 104.

In an alternate embodiment, interface logic 112 of host environment 102 generates the scripting environment representation of the data item and passes it to scripting environment 104 along with host environment representation 114 of the data item. In accordance with such an embodiment, interface logic 112 converts host environment representation 114 into a scripting environment representation and passes such representation to scripting environment 104, which stores it as a scripting environment representation element 132 in data structure 126. Thus, this alternate embodiment does not allow for "lazy conversion" of the data item.

After obtaining the scripting environment representation of the data item, scripting environment 104 then modifies that representation in a manner specified by script 122 to generate a scripting environment representation of the modified data item. Scripting environment 104 then stores such scripting environment representation of the modified data item as scripting environment representation element 132 of data structure 126. In the case where scripting environment 104 modifies the data item, scripting environment 104 also sets the state of a modification indicator 136 included in data structure 126 to indicate that the data item has been modified.

In a case in which scripting environment 104 is not required to modify the data item, scripting environment 104 need only ensure that the state of modification indicator 136 reflects that the data item has not been modified. In one embodiment, modification indicator 136 is initialized to a state that indicates that no modification has occurred. Thus, in accordance with such an embodiment, scripting environment 104 need only leave modification indicator 136 in its default state to indicate that no modification has occurred. In an alternate embodiment, scripting environment 104 actively sets the state of modification indicator 136 after initialization to indicate that no modification has occurred.

After scripting environment 104 has processed the data item, and in some cases modified data structure 126 as described above, scripting environment 104 passes data structure 126 to interface logic 112 of host environment 102. At step 220, interface logic 112 of host environment 102 receives data structure 126 that has been passed thereto.

At step 230, interface logic 112 of host environment 102 examines the state of modification indicator 136 of data structure 126 to determine whether or not scripting environment 104 has modified the data item. For example, in one embodiment, modification indicator 136 may comprise a flag having two states: "Y" and "N," wherein a state of "Y" indicates that the data item was modified by scripting environment 104 and a state of "N" indicates that the data item was not modified by scripting environment 104. However, this is only an example, and any of a wide variety of explicit or implicit indicators may be used. For example, in one embodiment, the inclusion of a scripting environment representation of the modified data item in data structure 126 may be sufficient to indicate that scripting environment 104 has modified the data item.

At step 240, if interface logic 112 of host environment 102 determines that scripting environment 104 has not modified the data item, then it obtains the host environment representation of the data item stored as element 134 of data structure 126 and passes it to host environment 102 for use in one or more processing steps subsequently performed by host environment 102. Note that in an alternate embodiment, if interface logic 112 of host environment 102 determines that scripting environment 104 has not modified the data item, it could simply reuse a value stored for the data item in interface logic 112, thus improving performance by avoiding having to read back the data from element 134 of data structure 126 stored inside the scripting environment 104. In either case, even though the data item has been passed to and from scripting environment 104, the representation of the data item that is semantically meaningful to host environment 102 has been preserved. Furthermore, if scripting environment 104 was not required to modify or observe the data item, then conversion of the data item can be avoided entirely in accordance with certain embodiments described above.

However, as shown at step 250, if interface logic 112 of host environment 102 determines that scripting environment 104 has modified the data item, then it obtains a host environment representation of the modified data item by obtaining a scripting environment representation of the modified data item stored as element 132 of data structure 126 and converting such representation back to a host environment representation. Thus, with continued reference to the example in which the data item is a date/time data item, step 250 may involve converting a 64-bit double precision floating point representation of the modified date/time used by scripting environment 104 into a 64-bit signed integer representation of the modified date/time used by hosting environment 102. Interface logic 112 then passes the host environment representation of the modified data item to host environment 102 for use in the processing step(s).

The foregoing approach to passing a data item from host environment 102 to scripting environment 104 and back again is advantageous in at least that: (1) it does not result in the loss of semantically meaningful information in cases where scripting environment 104 is not required to modify the data item; (2) it does not require a developer to learn and manage new data types that are not normally associated with scripting environment 104; and (3) it can improve system performance by enabling lazy conversion of data items or by avoiding conversion entirely.

Figure 3:
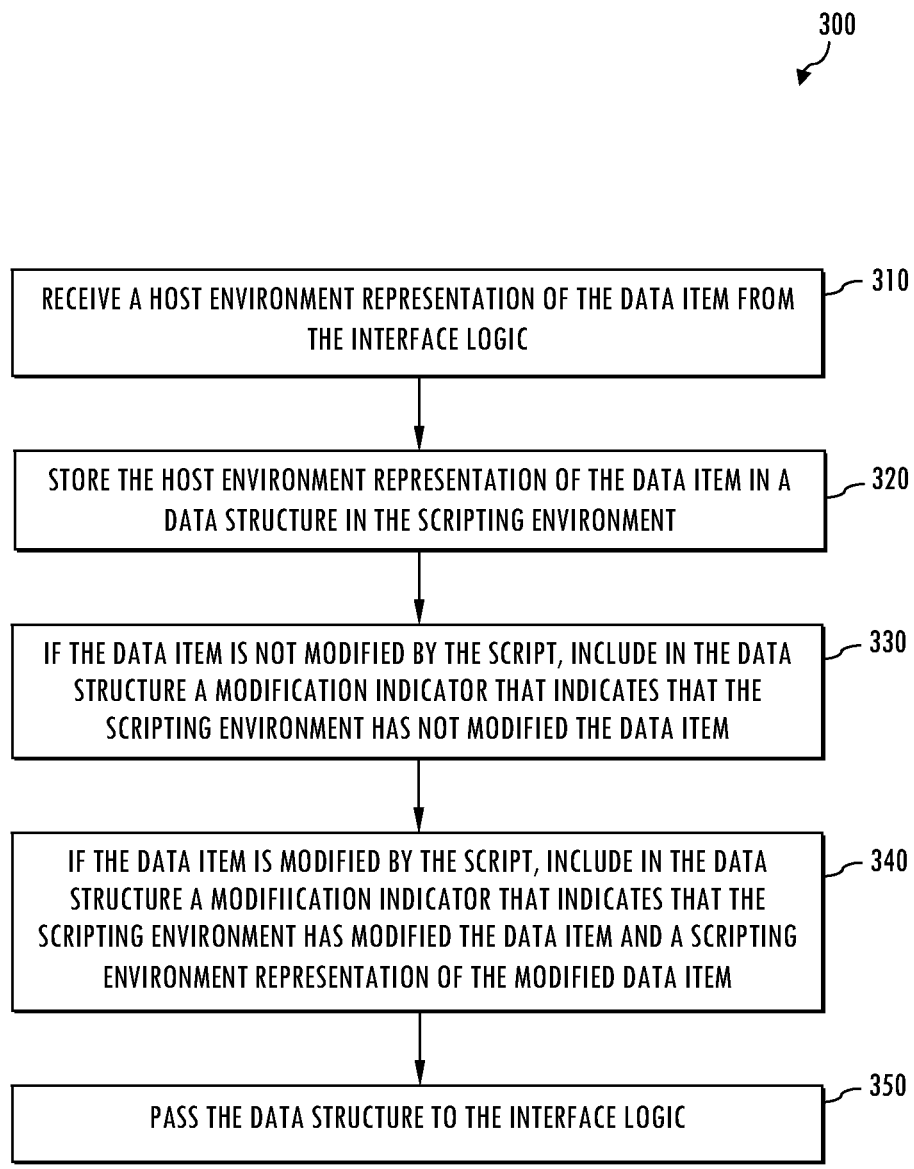
FIG. 3 depicts a method for obtaining a data item from and passing the data item to a host environment that is hosting a scripting environment in accordance with an embodiment.

FIG. 3 depicts a flowchart 300 of a method for obtaining a data item from hosting environment 102 by scripting environment 104 and returning the data item to hosting environment 102 from scripting environment 104 in accordance with one embodiment. In contrast to flowchart 200 of FIG. 2, which was intended to represent steps performed by host environment 102 and/or interface logic 112, flowchart 300 is intended to represent steps performed by scripting environment 104. The method of flowchart 300 will now be described with continued reference to various elements of system 100 of FIG. 1. However, the method of flowchart 300 is not limited to that implementation and may be carried out using other elements or systems entirely.

The method of flowchart 300 is performed after host environment 102 has created an instance of scripting environment 104. The data item referred to in flowchart 300 is a data item that is maintained by host environment 102 and that is also referenced by a script 122 being executed by scripting environment 104. Depending upon the implementation, script 122 may be provided to scripting environment 104 by host environment 102 or via some other mechanism.

As shown in FIG. 3, the method of flowchart 300 begins at step 310, in which scripting environment 104 receives host environment representation 114 of the data item from interface logic 112 of host environment 102. At step 320, scripting environment 104 stores host environment representation 114 of the data item in element 134 of data structure 126. As discussed above, scripting environment may or may not further modify data structure 126 depending upon the contents of script 122.

As shown at step 330, if scripting environment 104 does not modify the data item, it includes modification indicator 136 in data structure 126 that indicates that it has not modified the data item. As discussed above, in one embodiment, modification indicator 136 is initialized to a state that indicates that no modification has occurred. Thus, in accordance with such an embodiment, scripting environment 104 need only leave modification indicator 136 in its default state to indicate that no modification has occurred. In an alternate embodiment, scripting environment 104 actively sets the state of modification indicator 136 after initialization to indicate that no modification has occurred.

However, as shown at step 340, if scripting environment 104 does modify the data item, then it includes modification indicator 136 in data structure 126 that indicates that it has modified the data item. This may involve, for example, changing the state of modification indicator 136 from an initialized or default state that indicates that no modification has occurred to new state that indicates that modification has occurred, although this is only an example. Furthermore, as also shown at step 330, if scripting environment 104 does modify the data item, then it includes in data structure 126 a scripting environment representation of the modified data item. Such representation is included as element 132 of data structure 126. Various methods by which scripting environment 104 may obtain such a scripting environment representation of the modified data item were described above in reference to flowchart 200 of FIG. 2 and will not be repeated here for the sake of brevity.

After scripting environment 104 has processed the data item, and in some cases modified data structure 126 as described above, scripting environment 104 passes data structure 126 to interface logic 112 of host environment 102 as shown at step 350. A manner in which host environment 102 may process such data structure 126 was described above in reference to steps 230, 240 and 250 of flowchart 200.

IV. Example Computer System Implementations

Figure 4:
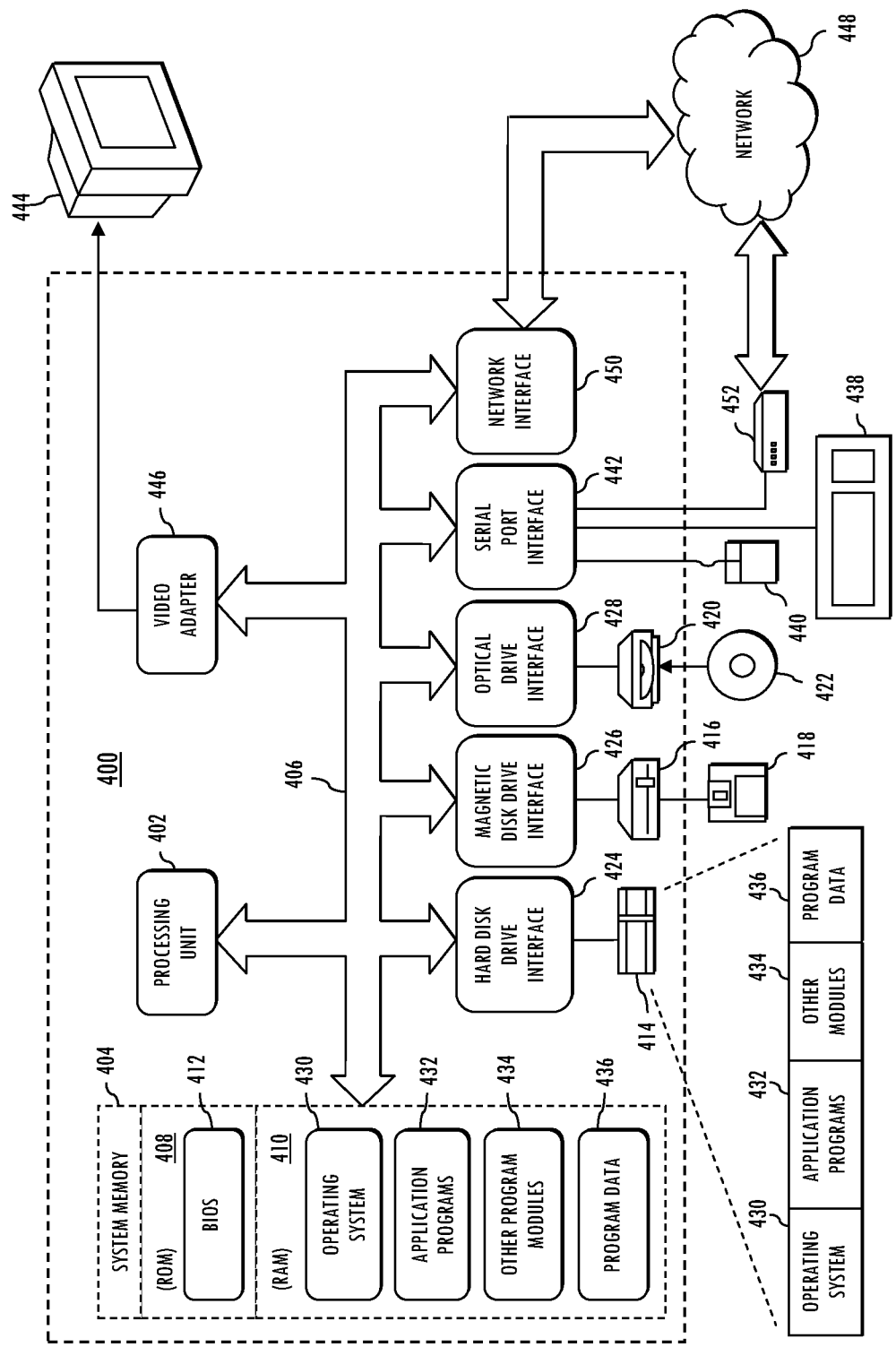
FIG. 4 is a block diagram of an example computer system that may be used to implement various embodiments described herein.

FIG. 4 depicts an example computer system 400 that may be used to implement various embodiments described herein. For example, computer system 400 may be used to implement either or both of host environment 102, scripting environment 104, as well as any sub-components thereof. The description of computer system 400 provided herein is provided for purposes of illustration, and is not intended to be limiting. Embodiments may be implemented in further types of computer systems, as would be known to persons skilled in the relevant art(s).

As shown in FIG. 4, computer system 400 includes a processing unit 402, a system memory 404, and a bus 406 that couples various system components including system memory 404 to processing unit 402. Processing unit 402 may comprise one or more processors or processing cores. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer system 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, BLU-RAY™ disk or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 430, one or more application programs 432, other program modules 434, and program data 436. In accordance with various embodiments, the program modules may include computer program logic that is executable by processing unit 402 to perform any or all of the functions and features of host environment 102, scripting environment 104, as well as any sub-components thereof, as described elsewhere herein. The program modules may also include computer program logic that, when executed by processing unit 402, performs any of the steps or operations shown or described in reference to FIGS. 2 and 3.

A user may enter commands and information into computer system 400 through input devices such as a keyboard 438 and a pointing device 440. Other input devices (not shown) may include a microphone, joystick, game controller, scanner, or the like. In one embodiment, a touch screen is provided in conjunction with a display 444 to allow a user to provide user input via the application of a touch (as by a finger or stylus for example) to one or more points on the touch screen. These and other input devices are often connected to processing unit 402 through a serial port interface 442 that is coupled to bus 406, but may be connected by other interfaces, such as a parallel port, game port, or a universal serial bus (USB).

A display 444 is also connected to bus 406 via an interface, such as a video adapter 446. In addition to display 444, computer system 400 may include other peripheral output devices (not shown) such as speakers and printers.

Computer system 400 is connected to a network 448 (e.g., a local area network or wide area network such as the Internet) through a network interface or adapter 450, a modem 452, or other means for establishing communications over the network. Modem 452, which may be internal or external, is connected to bus 406 via serial port interface 442.

As used herein, the terms "computer program medium" and "computer-readable medium" are used to generally refer to non-transitory media such as ROM 408 and RAM 410 used to implement system memory 404, the hard disk associated with hard disk drive 414, removable magnetic disk 418, removable optical disk 422, as well as other media such as flash memory cards, digital video disks, and the like.

As noted above, computer programs and modules (including application programs 432 and other program modules 434) may be stored on ROM 408, RAM 410, the hard disk, magnetic disk, or optical disk. Such computer programs may also be received via network interface 450 or serial port interface 442. Such computer programs, when executed by processing unit 402, enable computer system 400 to implement features of embodiments discussed herein. Accordingly, such computer programs represent controllers of computer system 400.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of host environment 102 and scripting environment 104, as well as any sub-components thereof may be implemented as hardware logic/electrical circuitry or firmware. In accordance with further embodiments, one or more of these components may be implemented in a system-on-chip SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for passing a data item to and obtaining the data item from a scripting environment that is hosted by a host environment, the data item being referenced by a script being executed by the scripting environment, the method comprising:
    passing from the host environment a host environment representation of the data item to the scripting environment, the host environment representation of the data item being a representation of the data item that is not referenced by the script being executed by the scripting environment;
    receiving at the host environment a data structure from the scripting environment that includes the host environment representation of the data item and an indicator;
    determining at the host environment whether the scripting environment has modified the data item based on a state of the indicator included in the data structure;
    in response to determining that the scripting environment has not modified the data item, obtaining, at the host environment, the host environment representation of the data item from the data structure for use in one or more processing steps subsequently performed by the host environment; and
    in response to determining that the scripting environment has modified the data item, obtaining, at the host environment, a host environment representation of the modified data item for use in the processing step(s), wherein obtaining the host environment representation of the modified data item comprises converting a scripting environment representation of the modified data item included in the data structure into the host environment representation of the modified data item.

2. The method of claim 1, further comprising:
    passing a scripting environment representation of the data item to the scripting environment along with the host environment representation of the data item.

3. The method of claim 1, wherein the data item comprises an object type that is natively supported by the host environment or the scripting environment.

4. The method of claim 1, wherein the host environment comprises software executing on a computer, the software comprising one of: a Web browser, a game application, an enterprise application, or an operating system.

5. The method of claim 1, wherein the scripting environment comprises a scripting engine executing on a computer.

6. A method for obtaining a data item from and passing the data item to a host environment that is hosting a scripting environment, the data item being referenced by a script being executed by the scripting environment, the method comprising:
    receiving at the scripting environment a host environment representation of the data item from interface logic that provides an interface between the host environment and the scripting environment, the host environment representation of the data item being a representation of the data item that is not referenced by the script being executed by the scripting environment;

storing the host environment representation of the data item in a data structure in the scripting environment;

if the data item is not modified by the script, including in the data structure, at the scripting environment, an indicator that indicates that the scripting environment has not modified the data item and passing the data structure from the scripting environment to the host environment via the interface logic, thereby indicating to the interface logic that the host environment representation of the data item is suitable for use in one or more processing steps subsequently performed by the host environment; and if the data item is modified by the script, including in the data structure, at the scripting environment, an indicator that indicates that the scripting environment has modified the data item and a scripting environment representation of the modified data item and passing the data structure from the scripting environment to the host environment via the interface logic, thereby indicating to the interface logic that the scripting environment representation of the modified data item should be converted into a host environment representation of the modified data item for use in the processing step(s).

7. The method of claim 6, wherein the scripting environment obtains the scripting environment representation of the modified data item by:
   converting the host environment representation of the data item into a scripting environment representation of the data item; and
   modifying the scripting environment representation of the data item.

8. The method of claim 6, wherein the scripting environment obtains the scripting environment representation of the modified data item by:
   modifying a scripting environment representation of the data item that was obtained from the host environment.

9. The method of claim 6, wherein the data item comprises an object type that is natively supported by the host environment or the scripting environment.

10. The method of claim 6, wherein the host environment comprises software executing on a computing device, the software comprising one of: a Web browser, a game application, an enterprise application, or an operating system.

11. The method of claim 6, wherein the scripting environment comprises a scripting engine executing on a computing device.

12. A system, comprising:
   one or more processors;
   a memory coupled to the one or more processors that stores software components for execution by the one or more processors, the software components including:
      a scripting environment;
      a host environment that invokes the scripting environment to execute a script that references a data item; and
      interface logic that operates to:
         pass a host environment representation of the data item from the host environment to the scripting environment, the host environment representation of the data item being a representation of the data item that is not referenced by the script that is to be executed by the scripting environment;
         receive a data structure from the scripting environment that includes the host environment representation of the data item and an indicator;
         determine whether the scripting environment has modified the data item based on a state of the indicator included in the data structure;
         in response to determining that the scripting environment has not modified the data item, obtain the host environment representation of the data item from the data structure for use by the host environment in one or more processing steps subsequently performed by the host environment; and
         in response to determining that the scripting environment has modified the data item, obtain a host environment representation of the modified data item for use by the host environment in the processing step(s) by converting a scripting environment representation of the modified data item included in the data structure into the host environment representation of the modified data item.

13. The system of claim 12, wherein the scripting environment comprises a scripting engine and the scripting engine operates to:
   determine whether the data item is to be modified by the script; and
   in response to determining that the data item is to be modified by the script:
      modify a scripting environment representation of the data item obtained via conversion of the host environment representation of the data item to generate the scripting environment representation of the modified data item;
      store the scripting environment representation of the modified data item in the data structure; and
      set the state of the indicator included in the data structure to indicate that the data item has been modified.

14. The system of claim 12, wherein the scripting environment comprises a scripting engine and the scripting engine operates to:
   determine whether the data item is to be modified by the script; and
   in response to determining that the data item is to be modified by the script:
      modify a scripting environment representation of the data item obtained from the host environment to generate the scripting environment representation of the modified data item;
      store the scripting environment representation of the modified data item in the data structure; and
      set the state of the indicator included in the data structure to indicate that the data item has been modified.

15. The system of claim 12, wherein the data item comprises an object type that is natively supported by the host environment or the scripting environment.

16. The system of claim 12, wherein the data item comprises one of a date, a number or a string.

17. The system of claim 12, wherein the host environment comprises one of a Web browser, a game application, an enterprise application, or an operating system, and the scripting environment comprises a scripting engine.

* * * * *